Nov. 11, 1969  J. E. GANTT ET AL  3,477,915
FRACTIONATION COLUMN SYSTEM OPERATING WITH MULTIPLE LEVEL
INTERNAL REBOILERS
Filed March 28, 1966

INVENTORS:
James E. Gantt
William B. Borst Jr.
BY:
*James R. Hoatson Jr.*
*Philip T. Liggett*
ATTORNEYS

United States Patent Office 3,477,915
Patented Nov. 11, 1969

3,477,915
FRACTIONATION COLUMN SYSTEM OPERATING WITH MULTIPLE LEVEL INTERNAL REBOILERS
James E. Gantt, Elmwood Park, and William B. Borst, Jr., Mount Prospect, Ill., assignors to Universal Oil Products Company, Des Plaines, Ill., a corporation of Delaware
Filed Mar. 28, 1966, Ser. No. 537,894
Int. Cl. B01d 3/14
U.S. Cl. 202—155          6 Claims

ABSTRACT OF THE DISCLOSURE

A fractional distillation column having at least two vertically spaced apart reboilers, both preferably being internal submerged reboilers, one being in the lower or bottom portion of the column and the other being at an elevation substantially above the lower reboiler but below the feed inlet to the column. The reboilers may be positioned in respective liquid retaining wells designed to permit normal vapor upflow and liquid downflow through the wells.

---

Figure 1:
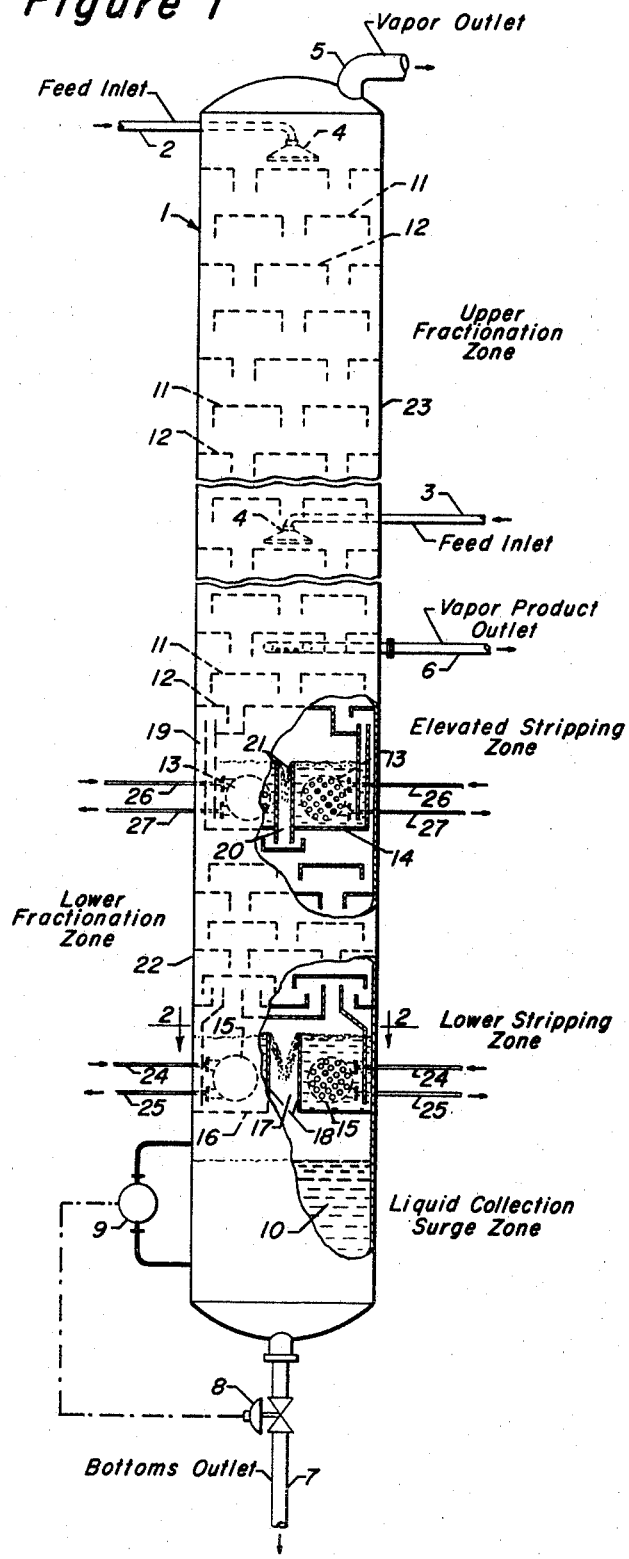

The present invention is directed to an improved fractionator column design or system which utilizes internal reboiling in a manner providing a more efficient utilization of available heat supplies, as well as better internal heating efficiency to the column itself.

In connection with the usual fractionating columns or stripping columns, there are of course various types of reboiler positions and reboiler feed systems. For example, there may be different vertical and horizontal baffle arrangements to separate a product withdrawal zone from the reboiler withdrawal section or from a trap-out section. Also, there have been used various reboiler positions, including both the horizontal and vertical thermosiphon arrangements, or pump-through systems. Internal reboilers of the "stab-in" type, where the tube bundles are directly within the lower liquid collection zone or surge zone, have been used to some extent in columns where reboiler duties have been relatively light; however, it appears they have not been used to advantage within liquid retaining wells or at multiple levels within a column such that there is a constant liquid level thereover. In certain operations, it is very advantageous and preferable that the lower reboiler means is out of a varying level surge zone.

In one aspect, it may be considered an object of the present invention to provide an improved column with internal reboiler means at least at an intermediate level or position so as to have a fractionation stage therebelow.

It is also an object of the present invention to provide a more economical improved type of heating to the fractionation column system through the use of a high temperature internal reboiler means at a low level in the column together with a reduced temperature reboiler means at an elevated level in the column above a heavy liquid fractionation section.

Broadly, the present invention provides in a process for the fractionation of a multiple component fluid stream within a vertically elongated fractionating system having multiple fractionation and stripping zones therein, suitable vapor-liquid contact decks, a bottoms collection zone, at least one fluid inlet, a bottoms-liquid outlet from the collection zone, and at least one vapor outlet means therefrom, the improved method of fractionating said stream through the use of multiple level heating in a manner which comprises, providing a heating of the bottoms liquid in a lower heat input zone of said column to effect a major portion of the total heat input to said column and at least partial vaporization of the bottoms liquid, effecting at least partial fractionation of the heavy fluid content in a lower fractionation zone maintained just above the lower bottoms heat input zone, at the same time continuously accumulating a constant level pool of downflowing fraction column liquid within an elevated internal reboiler zone maintained just above said lower fractionation zone, and introducing additional heating to said column through an indirect heat exchange fluid being supplied to said elevated reboiler zone and effecting an increased latent heat input to the liquid therein, whereby there is a resulting more efficient utilization of total heat being supplied to the system.

In another embodiment, the present invention provides in a process for effecting the fractionation of a multiple component fluid stream within a vertically elongated fractionating system having multiple fractionation and stripping zones therein, suitable vapor-liquid contact decks, a bottoms collection zone, at least one fluid inlet, a bottoms-liquid outlet from the collection zone, and at least one vapor outlet means therefrom, the improved method of fractionating said stream through the use of multiple level heating from internal means, which comprises, maintaining a lower internal reboiling zone within the lower portion of the system and having heat exchange reboiler zone means being submerged within at least a portion of the bottoms liquid, introducing high temperature indirect heating into said reboiler zone and effecting a heating of said column with at least partial vaporization of the bottoms liquid therein together with at least some fractionation of the heavy fluid content in a lower fractionation zone, at the same time continuously accumulating a constant level pool of downflowing fractionating column liquid within an upper internal reboiler zone being maintained above said lower fractionation zone and its subadjacent lower reboiler zone, and introducing additional heating to said column through an indirect heat exchange fluid being supplied to said upper internal reboiler zone and effecting an increased latent heat input to the liquid therein, whereby there is a resulting more efficient utilization of heat being supplied to said column system.

It is realized that there may be required a larger diameter, short tube length heat exchange bundle for use as an internal reboiler within a small diameter column, or the provision for liquid flow around tubes within a portion of reboiler shall be maintained outside of a column. However, there are several advantages that are obtained by the present internal reboiler arrangement and the resulting heating system. For instance, in both the upper and lower reboiler locations, with the elimination of shells and the accompanying external fluid flow around the heat exchanger tubes, there is an elimination of varying liquid flow rates out of and back into the fractionating column and the corresponding elimination of varying heat input rates to the column. In a preferred arrangement, where the lower reboiler zone is separate from or at least spaced slightly above the bottom of the liquid level within the lower end of the column, there is the advantage of obtaining a quiescent liquid surge zone undisturbed by liquid withdrawal and vapor-liquid back flow from a reboiler. Considerable difficulty, or undesirable effects, can result from vapors entering the column at a high velocity from an external reboiler. Conversely, with an internal reboiler the vapor velocity therefrom is close to optimum and at the same time, there is obtained a uniform liquid head over the reboiler tubes in its own partitioned section versus being either internally or externally subjected to a varying liquid head. Actually, it is difficult, with external liquid level measurement means, to tell where the internal level, or degree of submergence, exists for a boiling liquid over an internal reboiler. With separate reboiler tube means, there is an elimination of the need of external level control means to maintain proper measurement and control of submergence over the reboiler tubes. For example, in a low pressure column or in a vacuum column a variation of one foot of pressure head can mean several degrees change in the boiling point for the liquid passing over the reboiler tubes. Still further, with the use of a separate reboiler tube or partitioned zone, there can be a minimum inventory of bottoms liquid in the lower end of the column.

Certain saving in material costs of course result from positioning a reboiler directly within a column since there is elimination of a shell and fluid process piping otherwise required to connect the reboiler to the column. The elimination of external reboilers also can greatly reduce the plot area which may be required for a fractionator to in turn provide a substantial savings where units are in limited areas. In still another aspect, it should be pointed out that a major operational economy is found in the present multiple level reboiler system, particularly in the more optimum use of different heat supply streams to the unit. More specifically, for most relatively high temperature fractionation or stripping operations there can be high pressure steam, such as 450 pound steam, supplied to the lower level reboilers and low pressure steam, such as 25 pound steam, supplied to the upper internal reboiler means. It is not intended, however, to limit the present invention to the use of only steam for providing heat to the internal reboilers, for there may well be heat exchange from other heat supply sources, including various hydrocarbon streams or other reactant streams. Further, it may be noted that there is an improved more efficient use of heat that is provided to an elevated zone of the column, above the bottom surge section and a lower fractionation section, especially with respect to latent heat aspects. In other words, where all heat input to a column is being effected in the lower surge zone, then there is necessarily used an excess of heating in order to carry adequate heat upwardly through the stripping and rectification sections of the elongated column. As a result there will generally be required a larger diameter column. However, where a portion of the total heat input to the fraction system is at an elevated level or point which may be considered, for example, just below a lower fractionation section, then a greater portion of the heat supply is utilized as latent heat in the overall fractionation or stripping operations being carried out within the particular column.

Thus, in an apparatus embodiment, the present invention provides a fractionation column with multiple level stripping sections and having internal reboiler means incorporated therein, which comprises in combination an elongated vertically positioned column having an upper and a lower fractionating section, with vertically spaced vapor-liquid contact decks positioned in each section throughout a major portion of the height of the column, at least one fluid inlet to said column and at least one fluid withdrawal means from the upper and bottom portions thereof, a liquid collection-surge zone in the bottom portion of said column, heat supply means connecting with such zone for heating bottoms liquid and providing vaporization of liquid below the lower fractionating section, partitioning means forming at least one elevated liquid well means at a level above said lower fractionating section, at least one tubular reboiler in a submerged position in last said well means providing an elevated stripping section and a further heat supply to said column at a level just below the upper fractionating section, and vapor passageway means and liquid overflow means through said liquid retaining well means for permitting normal counter-current liquid-vapor flows through said column.

In another, and somewhat more specific embodiment, the present invention provides for a modified fractionation column arrangement and operational system with multiple level reboiler means, which comprises in combination, an elongated vertically positioned column having an upper rectifying section, a lower stripping section and vertically spaced vapor-liquid contact decks positioned in each section throughout a major portion of the height of the column, at least one fluid inlet to said column and at least one fluid withdrawal means from the upper and bottom portions thereof, a liquid collection-surge zone in the bottom portion of said column, partitioning means forming a liquid retaining well means in the lower portion of said column and spaced just above said liquid collection-surge zone, at least one heat supplying tubular reboiler in a submerged position in said well means, within said column, additional partitioning means forming another liquid well means at a level substantially above first said well means, and at least one tubular reboiler in a submerged position in the latter providing a further heat supply to said column at a level just below an upper rectification zone, and vapor passageway means and liquid overflow means through each of said liquid retaining well means for permitting normal countercurrent liquid-vapor flows through said column.

It is not intended to limit the present invention to the use of any predetermined numbers or levels of reboilers inasmuch as one, two, or more reboilers may be utilized at each level within the column. Also, side reboilers or external reboilers may be used in combination with internal reboilers, where desired, within the scope of this invention. In addition, various forms or designs of liquid wells to accommodate the internal reboiler means may be utilized as long as there is proper weir means to effect a liquid overflow from each zone and a substantially constant liquid level to permit uniform heating over the reboiler tubes. Still further, various forms of vapor riser zones or passageway means may be provided to accommodate the upward vapor flows at each of the reboiler levels.

Reference to the accompanying drawing and the following description thereof will serve to illustrate one embodiment of the present invention as well as point out additional advantages which may be obtained from the multiple level internal reboiler system.

FIGURE 1 of the drawing is a diagrammatic elevational view of an improved fractionation system including two levels of internal reboiler units.

Figure 2:
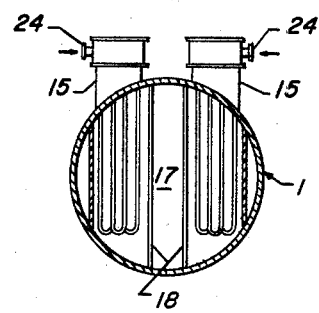

FIGURE 2 of the drawing is a diagrammatic sectional plan view, as indicated by line 2—2 in FIGURE 1.

Figure 3:
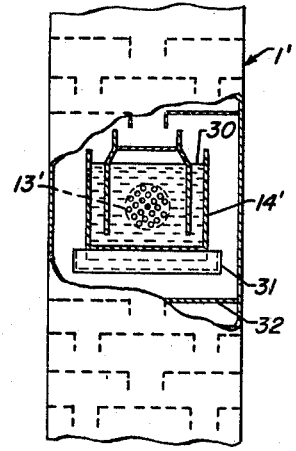

FIGURE 3 of the drawing is a partial elevational view indicating diagrammatically the placement of a single internal reboiler unit within an upper reboiler level of a fractionating column, in lieu of the dual reboiler arrangement indicated in FIGURE 1.

Referring now specifically to FIGURES 1 and 2 of the drawing, there is indicated a vertically elongated fractionating column 1 which may be utilized to effect the stripping or fractionation of a multiple component stream, a portion of which may be introduced by way of an upper feed inlet line 2 along with feed from an intermediate line 3. The latter may distribute the feed stream through suitable spray nozzles, such as 4, or alternatively there may be used suitable perforate distributing rings and the like. There is also indicated diagrammatically, an upper vapor outlet 5, an intermediate vapor outlet 6, and a bottoms liquid outlet line 7 having control valve 8 operating responsive to a liquid level control means 9 extending across at least a critical height portion of a liquid collection-surge zone 10. Throughout the principal portion of the column height, there are utilized vertically spaced vapor-liquid contacting decks 11 and 12 so as to provide an adequate number of stages of fractionation for the particular column service.

In accordance with one embodiment of the present invention, there is indicated the use of two spaced internal reboiler levels providing in effect two separate stripping sections, such as from the upper pair of reboilers 13 within internal well means 14 and a lower set of internal reboilers 15 within well means 16. The latter is indicated diagrammatically as having a vertical vapor passageway 17 provided between liquid overflow or weir plates 18. In a somewhat different design, the well 14 for the upper level of reboilers is arranged to have external vapor passageways 19 discharging beneath the next higher vapor-liquid tray 12, while at the same time there is a centrally located downspout arrangement 20 providing for the downflow of liquid from overflow plates or weirs 21. In each instance it will be noted that there is a resulting substantially constant liquid level maintained in each of the liquid retaining wells and in turn resulting uniform liquid heads over the tube bundles for each of the internal reboiler units 13 and 15. However, the liquid height within well 14 may not necessarily be the same as that maintained within the well 16.

Also in accordance with the present improved column system, there is indicated a lower fractionation section 22, with at least a low plurality of vapor-liquid trays positioned between the upper and lower internal reboiler stripping sections. This arrangement permits some fractionation for the heavy bottoms material flowing to the lower portion of the fractionating column 1, while at the same time there is a provision for a major portion of the heat input into the column through the lower reboiler units 15. However, as has been pointed out, the use of an upper level of internal reboiler means 13 within the well section 14 provides for additional heat input into the column at a zone where there is a high heat utilization, by way of latent heat input. Preferably, the upper reboiler section is positioned just below the lowermost deck or tray which is required for the upper fractionation section 23, as well as above a lower fractionation section, such as 22, providing for at least some fractionation of high reboiling materials in the lower portion of column 1. The upper reboiler section will of course also be placed below any intermediate feed inlet line, such as 3, and below any intermediate product outlet line, such as 6.

To illustrate the improved utility of the present system, there may be considered a large stripping column installation utilizing lower internal reboiler means, such as indicated at 15, providing a temperature of the order of 375° to 385° F. from 450 pound steam being supplied by way of lines 24 and discharged by way of lines 25. In this instance, the reboiler heating may provide latent heat of the order of 80 to 90 B.t.u. per pound. At the same time, at an upper reboiler level, utilizing internal reboiler means such as 13, there is provided 25 pound steam from inlet lines 26 and return lines 27 such that there will be a temperature of the order of 200° F. However, in this instance latent heat will be of the order of 120 B.t.u. per pound. It will thus be seen that more latent heat is obtained from the elevated internal reboilers and a more efficient heat input to the column from the dual level arrangement. By way of comparison, it should also be pointed out that in a fractionation column providing an equivalent service with a single level of reboiler means at the bottom of the column and in combination with the liquid collection or surge zone, there would be needed reboiler means providing at least 400° F. of heat level and a fractionating column which would generally be of a greater diameter by ½ foot, or 1 foot, or more.

The present FIGURE 1 indicates the lower reboilers 15 within their own wells or partitioning means such that there is a constant liquid level over the tube bundle in each instance and a resulting more constant maintenance of boiling point control within the column. In a modified arrangement, the lower reboiler means may be in direct contact with the bottom liquid in the lower collection zone or surge zone; however, in this instance, there is not the same degree of control of boiling point and vaporization over the heat exchanger tubes of the reboiling units even though liquid level control means is used in connection with the surge zone. In most operations, the liquid level control is designed and adjusted to maintain a relatively uniform regulated flow for the bottoms discharge from the column and there is a resulting varying liquid level in the surge zone which may be of the order of 3 to 4 feet, or more. To illustrate the effect this may have, it may be noted that for certain liquids, as for example one commercially used type of aromatic solvent for a solvent extraction process, with a 1 foot variation in liquid level over a reboiler unit at atmospheric pressure, or slightly below, can change the boiling point of the liquid as much as 5.5° F.

Referring now to FIGURE 3 of the drawing there is indicated a fractionating column 1' utilizing a single internal reboiler means 13' within an internal elevated well 14' which is designed to have an end liquid overflow weir 30 which in turn distributes liquid into a lower distributing pan 31 arranged over the next lower liquid tray 32.

Again it is desired to point out that it is not intended to limit the present invention to any one specific partitioning means for positioning the internal reboilers, nor to utilize any one internal well design which will maintain a substantially constant liquid level over the internal reboiler units. Still further, the fractionating columns may utilize any one of the various forms of bubble trays or vapor-liquid contacting decks, including perforate plate or sieve tray type of decks, as well as valve tray decks, where there are a multiplicity of lift valve members which can operate responsive to the upward flow of vapors. Generally, the columns utilizing internal reboiling means will be of relatively large diameter and the vapor-liquid tray means will provide for two or more liquid passes across each of the tray means; however, it is not intended to limit the contact decks to a design with any predetermined number of passes.

We claim as our invention:

1. A fractional distillation column which comprises in combination, an elongated vertically positioned column having an upper and a lower fractionating section, with vertically spaced vapor-liquid contact decks positioned in each section throughout a major portion of the height of the column, at least one feed inlet from an external source to said column, a vapor outlet from the upper portion of the column for vapor removal from the column and a liquid bottoms outlet from the bottom portion of the column, a liquid collection-surge section in the bottom portion of said column, a first well means above the liquid collection-surge section, heat supplying means connecting with said first well means for heating first well liquid and providing vaporization of liquid in the lower fractionating section a first external source of heating medium foreign to the feed connecting with and supplying said heat supplying means, partitioning means forming at least one elevated liquid retaining second well means at a level above said first well means and between said fractionating sections and below said feed inlet, at least one tubular reboiler in a submerged position in said second well means, a second external source of heating medium foreign to the feed connecting with and supplying said reboiler, and vapor passageway means and liquid overflow means through said first and second liquid retaining well means for permitting normal countercurrent liquid-vapor flows through said column.

2. A fractional distillation column which comprises in combination, an elongated vertically positioned column having upper and lower fractionating sections, with vertically spaced vapor-liquid contact decks positioned in each section throughout a major portion of the height of the column, at least one feed inlet from an external source to said column, a vapor outlet from the upper portion of the column for vapor removal from the column and a liquid bottoms outlet from the bottom portion of the column, a liquid collection-surge section in the bottom portion of said column, partitioning means forming a first liquid retaining well means in the lower portion of said column and spaced above said liquid collection-surge section, at least one heat supplying tubular reboiler in a submerged position in said first well means, a first external source of heating medium foreign to the feed connecting with and supplying said reboiler, additional partitioning means forming a second elevated liquid retaining well means at a level substantially above said first well means and between said fractionating sections and below said feed inlet, at least one tubular reboiler in a submerged position in said second well means, a second external source of heating medium foreign to the feed connecting with and supplying said last mentioned reboiler, and vapor passageway means and liquid overflow means through said first and second liquid retaining well means for permitting normal countercurrent liquid-vapor flows through said column.

3. The column of claim 2 further characterized in that said first liquid retaining well means in the lower portion of the column is spaced just above the upper liquid level for said surge section and the plate means forming said well provides for a constant liquid level over the tubular reboiler means therein.

4. A fractional distillation column comprising
  (1) an elongated vertically positioned column having an upper and a lower fractionating section;
  (2) a plurality of vertically spaced vapor-liquid contact decks positioned in each section throughout a major portion of the height of the column;
  (3) a first feed inlet from an external source to the upper portion of the column, and a second feed inlet from an external source to an intermediate portion of the column;
  (4) a first vapor outlet from the upper portion of the column for vapor removal from the column, a second vapor outlet from said intermediate portion for vapor removal from the column, and a liquid bottoms outlet from the bottom portion of the column;
  (5) a liquid collection-surge section in the bottom portion of said column and a first well means above the liquid collection-surge section;
  (6) heat supplying means connecting with said first well means for heating first well liquid and providing vaporization of liquid in the lower fractionating section;
  (7) a first external source of heating medium foreign to the feed connecting with and supplying said heat supplying means;
  (8) partitioning means forming at least one elevated liquid retaining second well means at a level above said first well means and below said second feed inlet and said second vapor outlet;
  (9) at least one tubular reboiler in a submerged position in said second well means;
  (10) a second external source of heating medium foreign to the feed connecting with and supplying said reboiler; and
  (11) vapor passageway means and liquid overflow means through said first and second liquid retaining well means for permitting normal countercurrent liquid-vapor flows through said column.

5. A fractional distillation column comprising:
  (1) an elongated vertically positioned column having an upper and a lower fractionating section;
  (2) a plurality of vertically spaced vapor-liquid contact decks positioned in each section throughout a major portion of the height of the column;
  (3) a first feed inlet from an external source to the upper portion of the column, and a second feed inlet from an external source to an intermediate portion of the column;
  (4) a first vapor outlet from the upper portion of the column for vapor removal from the column, a second vapor outlet from said intermediate portion for vapor removal from the column, and a liquid bottoms outlet from the bottom portion of the column;
  (5) a liquid collection-surge section in the bottom portion of said column;
  (6) partitioning means forming a first liquid retaining well means in the lower portion of said column and spaced adjacent and above said liquid collection-surge section;
  (7) at least one heat supplying tubular reboiler in a submerged position in said first well means within said column;
  (8) a first external source of heating medium foreign to the feed connecting with and supplying said reboiler;
  (9) additional partitioning means forming a second elevated liquid retaining well means at a level substantially above said first well means and between said fractionating sections and below said second feed inlet and said second vapor outlet;
  (10) at least one tubular reboiler in a submerged position in said second wall means;
  (11) a second external source of heating medium foreign to the feed connecting with and supplying said last-mentioned reboiler; and
  (12) vapor passageway means and liquid overflow means through said first and second liquid retaining well means for permitting normal countercurrent liquid-vapor flows through said column.

6. The apparatus of claim 5 further characterized in that said first source of heating medium comprises high pressure steam and said second source of heating medium comprises low pressure steam.

References Cited

UNITED STATES PATENTS

| 2,555,939 | 6/1951  | Sherwin  | 203—100 XR |
| 2,578,925 | 12/1951 | Davis    | 202—158    |
| 2,646,392 | 7/1953  | Gerhold  | 202—158    |
| 2,666,737 | 1/1954  | Hurd     | 202—158    |
| 2,785,961 | 3/1957  | Carter   | 261—148    |
| 2,502,251 | 3/1950  | Dennis   | 62—42      |
| 2,627,731 | 2/1953  | Benedict | 62—44      |

FOREIGN PATENTS

| 456,080 | 3/1950 | Italy.         |
| 776,154 | 6/1957 | Great Britain. |

WILBUR L. BASCOMB, Jr., Primary Examiner

DAVID EDWARDS, Assistant Examiner

U.S. Cl. X.R.

202—181; 203—100, 99; 261—148